United States Patent [19]

Kano et al.

[11] Patent Number: 5,019,733
[45] Date of Patent: May 28, 1991

[54] AC GENERATOR

[75] Inventors: Kouji Kano; Hajime Tabata, both of Saitama; Toshikazu Kawakami, Tokyo, all of Japan

[73] Assignee: Honda Giken Kogyo Kabushiki Kaisha, Tokyo, Japan

[21] Appl. No.: 247,256

[22] Filed: Sep. 21, 1988

[30] Foreign Application Priority Data

Sep. 25, 1987 [JP] Japan .................. 62-147315

[51] Int. Cl.⁵ .................. H02K 9/00; H02K 1/32
[52] U.S. Cl. .................. 310/61; 310/52; 310/54; 310/58
[58] Field of Search .......... 310/52, 54, 58, 59, 310/61, 263

[56] References Cited

U.S. PATENT DOCUMENTS

| | | | |
|---|---|---|---|
| 3,591,816 | 7/1971 | Sakamoto | 310/263 |
| 3,742,266 | 6/1973 | Heller et al. | 310/61 |
| 4,221,982 | 9/1980 | Raver | 310/54 |
| 4,350,908 | 9/1982 | Riffe | 310/61 |
| 4,757,221 | 7/1988 | Kurihashi | 310/58 |
| 4,902,922 | 2/1990 | Annouazzi | 310/61 |

FOREIGN PATENT DOCUMENTS

| | | | |
|---|---|---|---|
| 2828473 | 1/1980 | Fed. Rep. of Germany | 310/54 |
| 59-92743 | 5/1984 | Japan | 310/54 |

Primary Examiner—Steven L. Stephan
Assistant Examiner—C. LaBalle
Attorney, Agent, or Firm—Lyon & Lyon

[57] ABSTRACT

An excitation-type AC generator having stator and field coils cooled by a fluid passing through passageways within the rotating shaft of the rotor. The fluid, either engine oil or outside air, is drawn into a hole in the end of the rotating shaft, transported axially through a passageway in the shaft, then forced radially outward through channels in the rotating shaft into the areas surrounding the field and stator coils, absorbing the heat generated and eliminating any need for an externally mounted centrifugal fan.

20 Claims, 4 Drawing Sheets

AC GENERATOR

BACKGROUND OF THE INVENTION

The field of the present invention is AC generators, specifically AC generators in automotive-type applications.

AC generators consisting of a housing supporting an internal stator wound with a stator coil electrically excited by the rotation of a magnetically-polarized rotor within the stator coil are well-known in the art. These devices are widely used in automotive, boating, and aviation applications to charge the batteries providing the ignition power in internal combustion engines. These AC generators, or alternators, are lighter and more reliable than the DC generators they have replaced in these applications.

The performance lifetime of the AC generators of the prior art depends to a large degree on the heat dissipation characteristics of the housing. The heat generated by the electric excitation, if not dissipated, can eventually cause failure of the device by causing the stator coil to burn out. In order to dissipate heat the AC generator of the prior art is provided with a centrifugal fan mounted on the rotor to cool the field coil and stator coil. The necessity of the centrifugal fan, however, requires the use of a relatively large housing for the AC generator. With the increasing complexity of automotive internal combustion engines, coupled with the ever-present demand for smaller, lighter, more fuel efficient vehicles, there exists a need in the art for a decrease in the size of AC generators.

SUMMARY OF THE INVENTION

It is an object of the present invention to reduce the size of AC generators by replacing the cooling of the centrifugal fan with a cooling fluid flowing internally through the device.

In a first aspect of the present invention, engine oil is forced out of the rotor shaft through strategically placed channels to flow around the stator and field coils, absorbing the heat generated by those coils, to be returned back to the source, preferably the engine oil supply. If the rate of oil flow is high enough, the heat generated by the stator and field coils will be effectively dissipated by the present invention at equilibrium engine operating temperature without the need for a centrifugal fan. Therefore, the goal of reducing the size of an AC generator is reached by eliminating the need for the centrifugal fan.

In another aspect of the present invention, the cooling medium consists of air drawn in through inlet ports in the housing, through a passageway in the rotor shaft, then centrifugally through channels extending radially outward toward the field coil and outwardly through ports in the housing. If the flow of air can be maintained at a high rate, the field and stator coils can be effectively cooled at engine operating temperature, and the need for a centrifugal fan eliminated.

DETAILED DESCRIPTION OF THE PREFERRED EMBODIMENTS

In the present invention the cooling fluid is led from the cooling fluid passageway formed in the rotating shaft into the housing, cooling the field coil and the stator coil. It is, therefore, unnecessary to provide a centrifugal fan and accordingly the housing can be made smaller and lighter.

Figure 1:
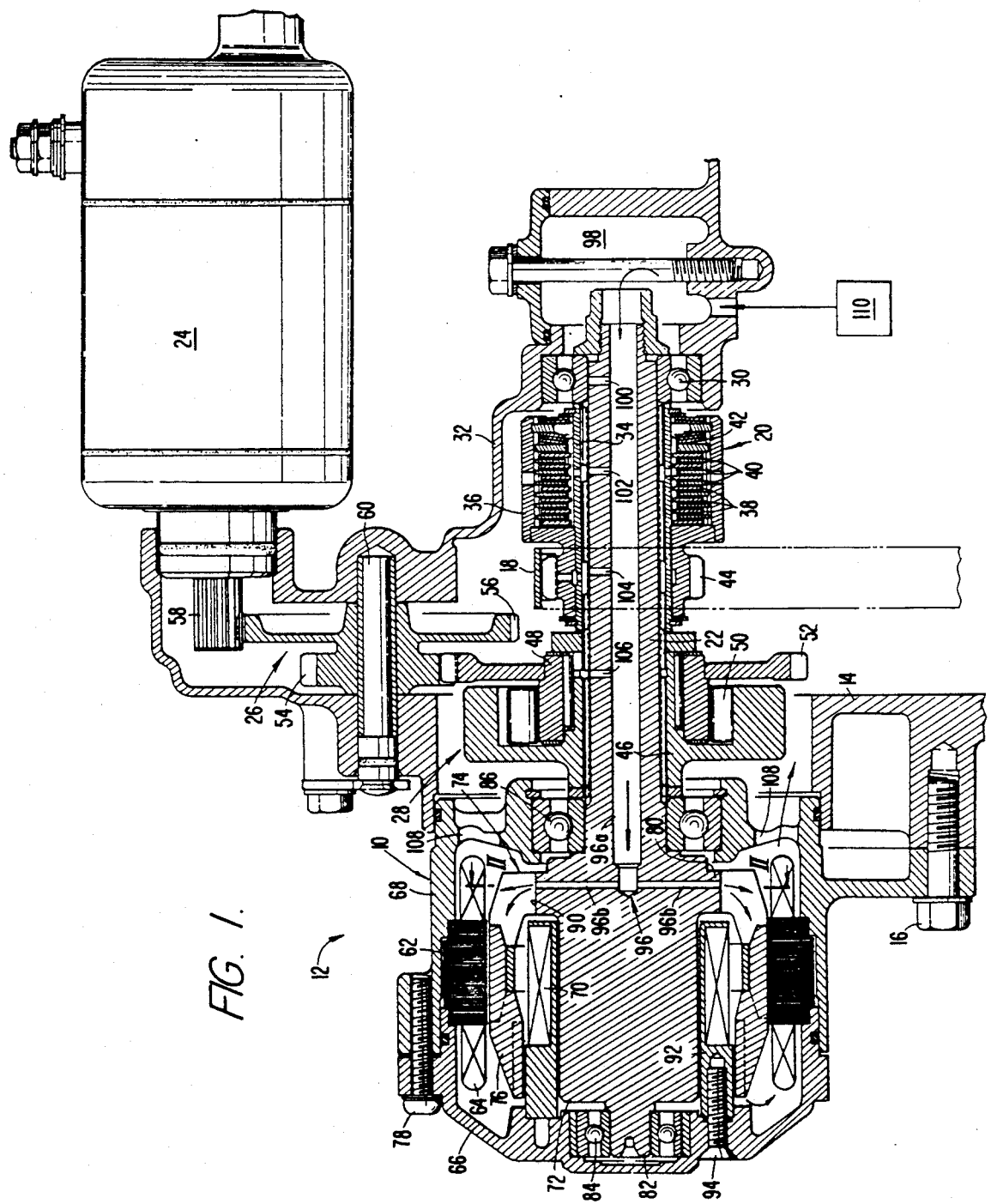
FIG. 1 is a longitudinal cross-sectional side view of the preferred embodiment of the invention.

FIG. 1 shows a first embodiment of the present invention, with a housing 10 of the excitation-type AC generator 12 connected to an engine body 14 by bolts 16. Power from a crankshaft which is not illustrated is input through a chain or belt 18 and a torque damper 20 to an input shaft section 22 projecting into the engine body 14 through a housing 10. Furthermore, a starting motor 24 for driving the afore-mentioned crankshaft when starting the engine is connected to the input shaft section 22 through a gear train 26 and a one-way clutch 28.

The forward end portion of the input shaft section 22 is rotatably supported through a bearing 30 in a support section 32 which is formed integral with the engine body 14. The torque damper 20 is a multiple-disc clutch, which consists of an inner 34, splined near the bearing 30 to the input shaft section 22, an outer 36 which rotatably surrounds the inner 34, a number of inner friction discs 38 axially movably engaged with the inner 34, outer friction discs 40 axially movably engaged with the outer 36 and positioned between the inner friction discs 38, and a spring 42 which produces a spring force in a direction in which each inner friction disc 38 and each outer friction disc 40 slide in contact with each other. The outer 36 is provided with a sprocket wheel 44, on which the aforesaid chain or belt 18 is mounted.

The one-way clutch 28 comprises a driven wheel 46 which is splined to the input shaft section 22, a driving wheel 48 which is rotatable in relation to the driven wheel 46, and a plurality of rollers 50 disposed between the driving wheel 48 and the driven wheel 46. Only a unidirectional rotation of the driving wheel 48 is transmitted to the driven wheel 46, and in turn the input shaft section 22, through the rollers 50. The turning force of the input shaft section 22 is not transmitted to the driving wheel 48. The gear train 26 comprises a gear 52 fixedly mounted on the driving wheel 48 described above, a gear 54 in mesh with the gear 52, and a gear 56 formed integral with the gear 54. The gear 56 meshes with an output gear 58 of the starting motor 24. The aforementioned gears 54 and 56 are rotatably supported on a supporting shaft 60 which is supported in parallel with the input shaft section 22 by the engine body 14.

Figure 2:
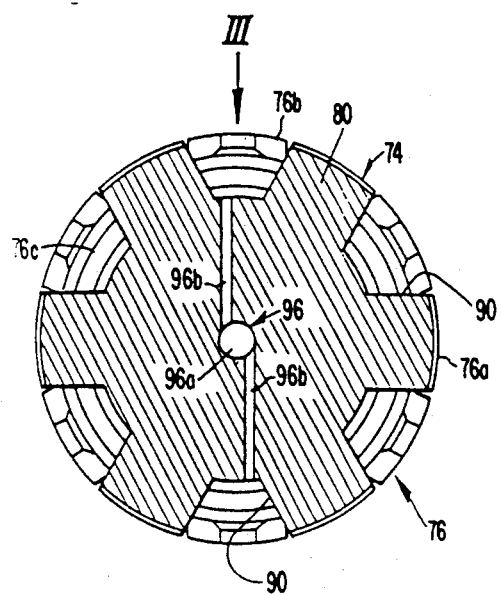
FIG. 2 is a cross-sectional view taken on line II—II in FIG. 1.
Figure 3:
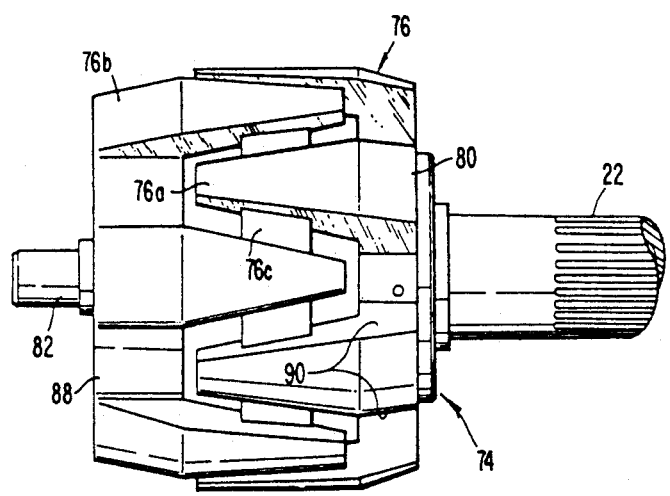
FIG. 3 is a view taken along the arrow III in FIG. 2.

Referring to FIGS. 1, 2 and 3, the housing 10 includes a stator 62 wound with a stator coil 64 which is held within components 66 and 68 of the housing 10, a field coil 70 positioned on the inner side of the stator 62 which is secured to the housing 10, and a rotating shaft 72 of a rotor 74 which has pole cores 76 disposed between the stator coil 64 and the field coil 70 and which is rotatably supported in the housing 10.

Both the components 66 and 68 are basically formed in a shape of a bottomed cylinder, and are connected by a plurality of bolts 78 with the stator 62 held between open end sections, thereby constructing the housing 10. The rotor 74 is formed by connecting the rotating shaft 72 disposed at the center thereof to the pole core 76 coaxially surrounding the rotating shaft 72 by the disc-like connector 80. A small-diameter support shaft section 82 coaxially protruding from one end of the rotating shaft 72 is rotatably supported in one component 68 through the bearing 84. The base end section of the input shaft section 22 coaxially connected to the other end of the rotating shaft 72 is rotatably supported by the other component 68 through the bearing 86. The input shaft section 22 projects into the engine body 14 to connect with the rotating shaft 72.

The pole core 76 basically takes the form of a cylinder with triangular core sections 76a equally spaced on the circumference of the disc-like connector 80 connected by a connector section 76c to triangular core sections 76b disposed between the core sections 76a. Cutouts 88 are provided between the core sections 76b at one end on the bracket 66 side. Cutouts 90 are provided between the core sections 76a at the other end on the bracket 68 side.

A cylindrical holder 92 coaxially mounted between the rotating shaft 72 in the rotor 74 and the pole core 76 is securely mounted to the bracket 66 by a bolt 94. On this holder 92 is wound the field coil 70. Therefore, the pole core 76 is arranged between the field coil 70 and the stator coil 64.

The rotating shaft 72 is bored to form an axially-oriented cooling fluid passageway 96 through which a cooling fluid, such as engine oil, is supplied to the stator coil 64 and the field coil 70. This cooling fluid passageway 96 consists of a passageway 96a formed by boring in a straight line from the input shaft section 22 through the inside of the rotating shaft 72 and a plurality of, two for example, outlet sections 96b, which are connected to the inner end of the passageway 96a. The outlet sections open to the outside surface of the rotating shaft 72 so as to direct the engine oil out from the passageway 96a to the stator coil 64. Both the outlet sections 96b are formed by boring radially through the rotating shaft 72 from the cutouts 90. The passageway 96a passes axially through the entire length of the input shaft section 22, opening at the forward end. The open end of the passageway 96a opens to the lubricating oil chamber 98 formed within the engine body 14. This lubricating oil chamber 98 is connected with an engine oil supply source, such as a pump, and accordingly the engine oil is supplied through the cooling fluid passageway 96.

The input shaft section 22 is bored further to form radially-oriented lubrication holes 100, 102, 104 and 106 to lead the engine oil flowing in the passageway 96a to the bearing 30, the torque damper 20, the sprocket wheel 44 and the one-way clutch 28. Furthermore, in the component 68 in the housing 10, recovery ports 108 are provided, at two circumferentially spaced places for example, for returning into the engine body 14 the engine oil that has been fed into the housing 10 and atomized therein, thereby preventing the gathering of engine oil in the housing 10.

Next, the operation of the preferred embodiment will be described. As the rotor 74 is rotated, a voltage is produced at the stator coil 64. The engine oil from the engine oil supply source 110 is supplied toward the stator coil 64 through the outlet sections 96b of the cooling fluid passageway 96, and also partly flows into the pole core 76 and then toward the field coil 70 side, thus cooling the stator coil 64 and the field coil 70. The engine oil, having a greater cooling effect than a gas such as air because of its greater thermal capacity, can fully cool the stator coil 64 and the field coil 70. The engine oil thus used for cooling is returned into the engine body 14 through the recovery ports 108.

The stator coil 64 and the field coil 70, as described above, can be fully cooled without a centrifugal fan as required in AC generators of the prior art, and, therefore, the housing 10 can be designed and made smaller by the elimination of the need for the centrifugal fan.

Figure 4:
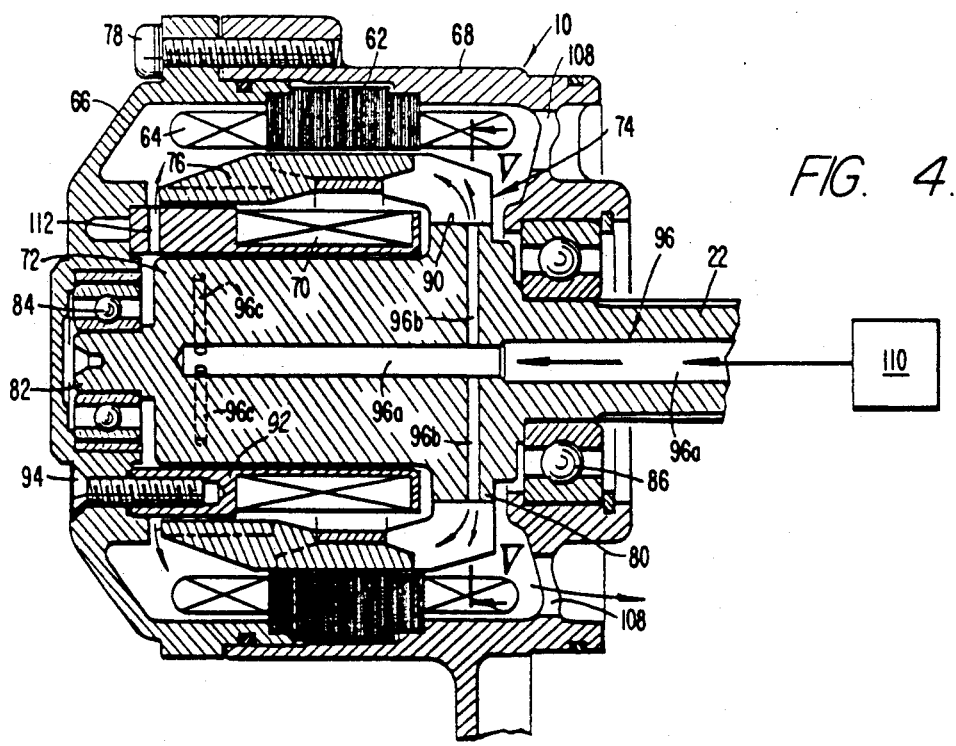
FIG. 4 is a longitudinal cross-sectional side view of a second embodiment of the invention.
Figure 5:
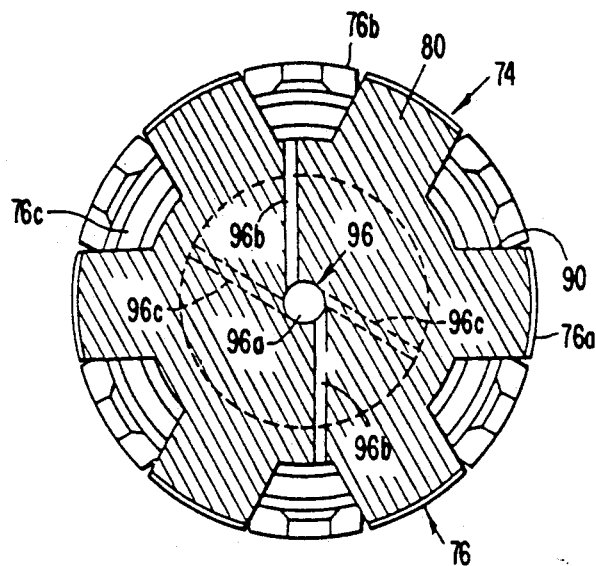
FIG. 5 is a cross-sectional view taken on line V—V in FIG. 4.

FIGS. 4 and 5 show a second embodiment of the present invention wherein the same numerals are used for corresponding parts in the first embodiment described above.

In the rotating shaft 72 in the rotor 74, a pair of outlet sections 96c which are open to the inside surface of the cylindrical holder 92 are provided which, along with the above-mentioned passageway section 96a and the outlet sections 96b, increases the amount of engine oil supplied to the field coil 70. The passageway 96a communicates with the inner end of the outlet sections 96c. The cylindrical holder 92 has a hole 112 for flow of the engine oil to the outside of the pole core 76.

According to this second embodiment, the amount of engine oil flowing to the field coil 70 is greater than that of the first embodiment, and therefore the field coil 70 covered with the pole core 76 can be fully cooled.

Figure 6:
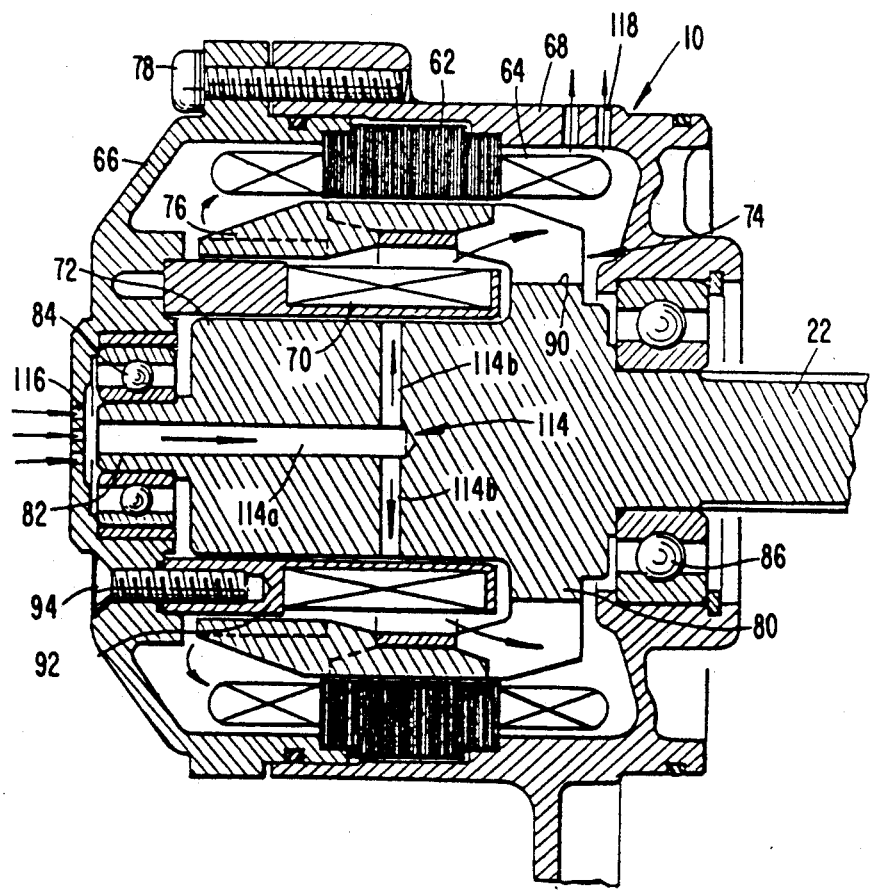
FIG. 6 is a longitudinal cross-sectional side view of a third embodiment of the invention.

FIG. 6 shows a third embodiment of the present invention in which the same numerals are used for corresponding parts in the embodiments described above.

The rotating shaft 72 is bored to form a cooling fluid passageway 114 for supplying a cooling fluid, such as air, to the field coil 70. This cooling fluid passageway 114 consists of a passageway section 114a formed by boring axially through the rotating shaft 72 to a position corresponding to the field coil 70, opening to the outer end of the supporting shaft section 82. A pair of outlet sections 114b are formed by radially boring through rotating shaft 72, both sections 114b communicating with the passageway 114a and opening to the outside surface of the rotating shaft 72.

At the center of one bracket 66, a plurality of inlet ports 116 are provided in order to lead the air from the outside of the housing 10 into the cooling fluid passageway 114. Furthermore, in the other bracket 68 a plurality of discharge ports 118 are provided.

In this third embodiment, the air is led out from the outlet sections 114b of the cooling fluid passageway 114 toward the field coil 70 by the rotation of rotor 74. Therefore, in the cooling fluid passageway 114, the air from the inlet ports 116 flows from the passageway 114a toward the outlet sections 114b; the air drawn in from the outside of the housing 10 is supplied to the field coil 70 by the rotation of the rotor 74; and the air coming out of the pole core 76 through the cutouts 88 and 90 is discharged at the discharge port 118 after cooling the stator coil 64.

Therefore, in the third embodiment of the invention, the stator coil 64 and the field coil 70 covered by the pole core 76 can both be fully cooled, using air as the cooling fluid.

Figure 7:
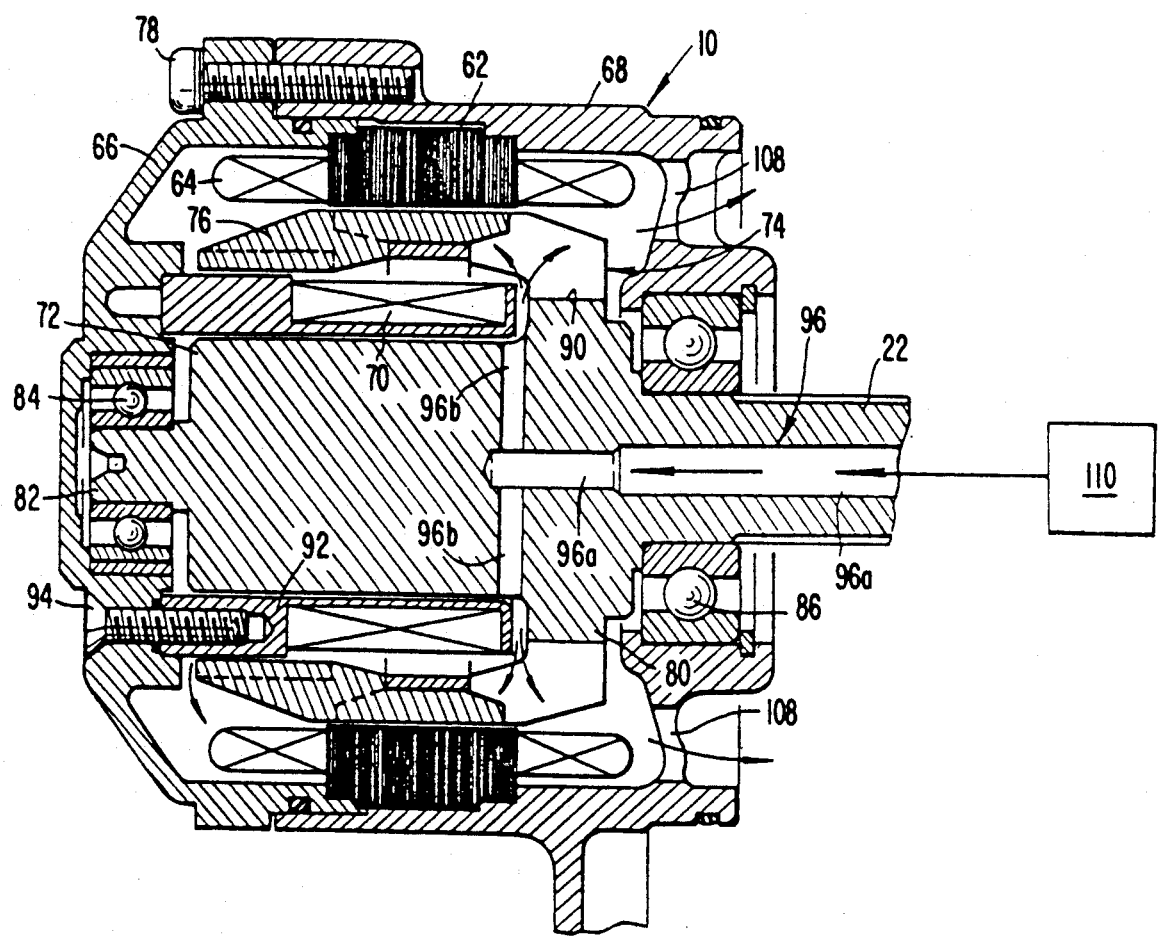
FIG. 7 is a longitudinal cross-sectional side view of a fourth embodiment of the invention.

FIG. 7 shows a fourth embodiment of the present invention in which the same numerals are used for corresponding parts used in the aforementioned embodiments.

In the rotating shaft 72 of the rotor 74, a pair of radially-oriented outlet sections 96b open at a position corresponding to the end section of the holder 92, to allow the flow of the engine oil toward the stator coil 64 through the side edge of the field coil 70 for the purpose of increasing the amount of engine oil to be supplied to the field coil 70. The passageway section 96a communicating with the inner end of the outlet sections 96b together constitute the cooling fluid passageway 96, which communicates with engine oil supply source 110.

In the above-described embodiments, the excitation-type AC generator 12 having a field coil 70 wound on the cylindrical holder 92 fixed in a housing 10 has been set forth. The present invention is also applicable to an excitation-type AC generator where a magnet (not shown) is fixedly mounted on the rotating shaft 72 to induce voltage in the stator coil 64.

Thus, according to the present invention as described above in all the embodiments, the rotating shaft is provided with a cooling fluid passageway which conducts cooling fluid to the inside of the housing, thereby cooling the stator and field coils without any need for a centrifugal fan and consequently enabling the use of a small-sized housing. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. An AC generator comprising:
   a housing;
   a stator wound with a stator coil secured to the inner surface of said housing;
   a rotor rotatably supported within said housing including a rotating shaft having a pole core centered within said stator coil, said rotating shaft containing a first cooling passageway opening into said housing;
   a field coil positioned inwardly of said pole core for magnetizing said pole core; and
   said rotating shaft containing a second cooling passageway opening toward said field coil.

2. The generator of claim 1 wherein said first cooling passageway is connected to an engine oil supply source such that engine oil may be used as a cooling fluid flowing through said first cooling passageway, said housing being provided with a port for returning said engine oil to said engine oil supply source.

3. The generator of claim 1, wherein said second cooling passageway is open to pass cooling fluid toward said stator coil through a side end of said field coil.

4. The generator of claim 1, further comprising an inlet port into said housing and an outlet port from said housing, said first cooling passageway being formed in said rotating shaft with one end opening to the outside of said housing through said inlet port in said housing, the other end opening toward said field coil and being in communication with said outlet port.

5. The generator of claim 1 wherein said first cooling passage includes an inlet located on the axis of said rotating shaft and an outlet located outwardly of the axis of said rotating shaft.

6. An AC generator comprising:
   a housing;
   a stator wound with a stator coil secured to the inner surface of said housing;
   a rotor rotatably supported within said housing including a rotating shaft having a plurality of pole cores centered within said stator coil, said rotating shaft containing a first cooling passageway opening into said housing;
   a field coil positioned inwardly of said pole cores for magnetizing said pole cores; and
   a second cooling passageway opening located at one side of said field coil and between said pole cores.

7. The generator of claim 6, wherein said pole cores are mutually spaced and interconnected by connectors and said second cooling passageway opening is located on a connector connected between each pole core.

8. The generator of claim 6, wherein said second cooling passageway opening is disposed to discharge cooling fluid between said pole core and said field coil.

9. The generator of claim 6, wherein said housing contains a cylindrical holder wound by said field coil; said cylindrical holer including a hole for flow of engine oil to the outside of said pole core toward said field coil.

10. An AC generator, particularly adapted for automotive-type applications, comprising:
    a housing;
    a stator wound with a stator coil disposed circumferentially about the interior of said housing;
    rotor means rotatably supported within said housing and having a pole core concentrically disposed with respect to said stator coil, and
    means for cooling said stator and said rotor means of said generator including:
       a cooling fluid passage formed in said rotor means, said passage extending substantially axially of said rotor means and having an inlet opening at one end thereof; and
    substantially radially extending outlet sections extending between and fluidly communicating said passage with the exterior of said rotor means, said outlet sections having open outer ends for the discharge of cooling fluid onto said stator and said rotor means.

11. The generator of claim 10, wherein said cooling fluid passageway is connected to an engine oil supply source; and means in said housing exteriorly of said rotor means for returning oil discharged from said passage to said supply source.

12. The generator of claim 10, wherein said cooling fluid passageway fluidly communicates with the exterior of said housing for supplying air as generator cooling fluid.

13. The generator of claim 12, wherein said housing contains first opening means forming an air inlet positioned adjacent said cooling fluid passage inlet opening and second opening means remote from said first opening means for discharging air from said housing.

14. The generator of claim 13, wherein said second opening means are positioned adjacent said stator coil.

15. The generator of claim 10, including a field coil in said housing concentrically spaced from said stator coil; said rotor means containing a rotor core concentrically disposed between said stator coil and said field coil; and said outlet sections having their discharge ends disposed in said rotor core.

16. The generator of claim 10, wherein said rotor means includes a rotating shaft journalled for rotation within said housing; and said inlet opening for said cooling fluid passage is disposed at the axial end of said rotating shaft.

17. The generator of claim 10, including a field coil in said housing concentrically spaced from said stator coil; said rotor means including a rotating shaft journalled for rotation within said housing and a rotor core axially spaced from said rotating shaft, said rotor core being and concentrically disposed between said stator coil and said field coil; said inlet opening for said cooling fluid passage being disposed at the axial end of said rotating shaft; and said outlet sections having their discharge ends disposed in said rotor core.

18. The generator according to claim 17, wherein said field coil is formed substantially as a hollow cylinder and said rotor core includes axially spaced outlet sections having their discharge ends communicating with the exterior of said rotor core adjacent opposite axial ends of said field coil.

19. The generator according to claim 10, wherein said outlet sections communicate substantially tangentially with said cooling fluid passage.

20. The generator of claim 10 wherein said rotor means includes a field coil and said outlet sections include open ends disposed at a side end of said field coil and arranged to pass cooling fluid toward said stator coil.

* * * * *